United States Patent [19]

Yonek

[11] Patent Number: 5,726,272

[45] Date of Patent: Mar. 10, 1998

[54] POLYUREA COATING COMPOSITIONS HAVING FASTER DRY TIMES

[75] Inventor: Kenneth P. Yonek, McMurray, Pa.

[73] Assignee: Bayer Corporation, Pittsburgh, Pa.

[21] Appl. No.: 597,419

[22] Filed: Feb. 8, 1996

[51] Int. Cl.$^6$ .................. C09D 175/02; C08G 18/30; C08G 18/32; C08G 18/76

[52] U.S. Cl. ................ 528/64; 528/52; 528/59; 528/60

[58] Field of Search ................ 528/52, 59, 64, 528/60

[56] References Cited

U.S. PATENT DOCUMENTS

| | | | |
|---|---|---|---|
| 3,420,800 | 1/1969 | Haggis | 528/59 |
| 3,567,692 | 3/1971 | Haggis et al. | 528/64 |
| 4,469,831 | 9/1984 | Bueltjer et al. | 524/112 |
| 4,720,535 | 1/1988 | Schleier et al. | 528/59 |
| 4,895,883 | 1/1990 | Pedain et al. | 521/159 |
| 5,444,117 | 8/1995 | Wade et al. | 524/590 |
| 5,523,376 | 6/1996 | Hicks et al. | 528/44 |
| 5,545,705 | 8/1996 | Hicks et al. | 528/52 |
| 5,629,403 | 5/1997 | Hicks et al. | 528/52 |
| 5,661,216 | 8/1997 | Laginess et al. | 528/52 |

*Primary Examiner*—Rabon Sergent
*Attorney, Agent, or Firm*—Joseph C. Gil; Thomas W. Roy

[57] ABSTRACT

The present invention relates to a coating composition for the preparation of a polyurea coating which contains a) an NCO prepolymer containing aromatically bound isocyanate groups and b) an aldimine corresponding to the formula

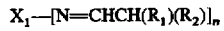

$$X_1\text{---}[N\text{=}CHCH(R_1)(R_2)]_n$$

wherein $X_1$ represents an organic group which has a valency of n and is obtained by removing the amino groups from a cyclic organic polyamine having (cyclo)aliphatically-bound amino groups, $R_1$ and $R_2$ may be identical or different and represent organic groups which are inert towards isocyanate groups at a temperature of 100° C. or less, or $R_1$ and $R_2$ together with the β-carbon atom form a cycloaliphatic or heterocyclic ring, and n represents an integer having a value of at least 2, in which components a) and b) are present in amounts sufficient to provide an equivalent ratio of isocyanate groups to aldimine groups of about 1.0:0.7 to 1.0:0.1.

12 Claims, No Drawings

POLYUREA COATING COMPOSITIONS HAVING FASTER DRY TIMES

BACKGROUND OF THE INVENTION

1. Field of the Invention

This present invention relates to coating compositions which have faster dry times without substantially affecting the pot lives of the coating compositions in which the binder is based on aromatic NCO prepolymers in combination with aldimines prepared from polyamines having cyclic groups.

2. Description of the Prior Art

One-component, moisture-curable coating compositions that contain NCO prepolymers as binders are known. When exposed to water, generally in the form of atmospheric moisture, the prepolymers react to form urea groups. In the absence of moisture, the NCO prepolymers possess good storage stability. Even after mixing with pigments that still contain residual water, the pot life is still adequate, i.e., generally at least 12 to 24 hours. This provides sufficient time to apply the coating compositions before the viscosity increases to the point where it is not possible to apply the coating compositions using conventional spray equipment without adding additional solvent.

One of the disadvantages of these coating compositions is that they have a relatively slow dry time, which is generally 5 to 6 hours or longer, even with NCO prepolymers prepared from aromatic polyisocyanates, i.e., polyisocyanates having aromatically-bound isocyanate groups.

Accordingly, it is an object of the present invention to provide moisture-curable coating compositions having faster dry times without a concurrent decrease in the pot lives of the coating compositions.

This object may be achieved with the coating compositions of the present invention, which contain NCO prepolymers containing aromatically-bound isocyanate groups and subequivalent quantities of aldimines prepared from cycloaliphatic diamines.

U.S. Pat. Nos. 3,420,800 and 3,567,692 disclose coating compositions containing polyisocyanates and equivalent amounts of either aldimines or kerimines, based on the amount of isocyanate groups. It is disclosed that the reaction of polyisocyanates with aldimines or ketimines in the presence of moisture is faster than the reaction of isocyanate groups with moisture. Therefore, by using equivalent amounts of aldimines or kerimines, it is possible to obtain faster dry times without substantially decreasing the pot life of the coating compositions. However, these references do not recognize that by using the coating compositions according to the present invention, it is possible to obtain faster dry times even when using subequivalent quantities of aldimines. The ability of obtain faster dry times when using less than equivalent quantities of aldimines is surprising because it would be expected that any isocyanate groups that did not react with the fast-reacting aldimine groups would slowly react with water in the normal manner. Therefore, as the amount of aldimine is decreased, the dry times would increase because more of the isocyanate groups react with water. However, the examples of the subject application demonstrate that this is not the case.

SUMMARY OF THE INVENTION

The present invention relates to a coating composition for the preparation of a polyurea coating which contains a) an NCO prepolymer containing aromatically bound isocyanate groups and b) an aldimine corresponding to the formula $$X_1[N=CHCH(R_1)(R_2)]_n$$

wherein $X_1$ represents an organic group which has a valency of n and is obtained by removing the amino groups from a cyclic organic polyamine having (cyclo)aliphatically-bound amino groups, $R_1$ and $R_2$ may be identical or different and represent organic groups which are inert towards isocyanate groups at a temperature of 100° C. or less, or $R_1$ and $R_2$ together with the β-carbon atom form a cycloaliphatic or heterocyclic ring, and n represents an integer having a value of at least 2, in which components a) and b) are present in amounts sufficient to provide an equivalent ratio of isocyanate groups to aldimine groups of about 1.0:0.7 to 1.0:0.1.

DETAILED DESCRIPTION OF THE INVENTION

In accordance with the present invention a "polyurea" is understood to mean a polymer containing urea groups and optionally other groups such as urethane groups. (Cyclo) aliphatically-bound means aliphatically- or cycloaliphatically-bound.

Component a) of the present invention is selected from NCO prepolymers containing aromatically bound isocyanate groups. These prepolymers are prepared by reacting an excess of monomeric polyisocyanates or polyisocyanate adducts, preferably monomeric diisocyanates, with organic compounds containing at least two hydroxy groups.

Examples of suitable monomeric polyisocyanates include monomeric diisocyanates represented by the formula $$R(NCO)_2$$

in which R represents an organic group obtained by removing the isocyanate groups from an aromatic organic diisocyanate, i.e., a diisocyanate having aromatically bound isocyanate groups, and having a molecular weight of about 112 to 1,000, preferably about 140 to 400. Preferred diisocyanates are those represented by the above formula in which R represents a divalent aromatic hydrocarbon group having 6 to 15 carbon atoms.

Examples of the suitable organic diisocyanates include 1,3- and/or 1,4-phenylene diisocyanate, 2,4- and/or 2,6-toluylene diisocyanate, 2,4- and/or 4,4'-diphenylmethane diisocyanate, 1,5-diisocyanato naphthalene and mixtures thereof. Aromatic polyisocyanates containing 3 or more isocyanate groups such as 4,4',4"-triphenylmethane diisocyanate and polyphenyl polymethylene polyisocyanates obtained by phosgenating aniline/formaldehyde condensates may also be used.

In accordance with a less preferred embodiment of the present invention the polyisocyanate component for the preparation of the NCO prepolymers is a polyisocyanate adduct containing isocyanurate, uretdione, biuret, urethane, allophanate, carbodiimide and/or oxadiazinetrione groups, and prepared from a monomeric polyisocyanate containing aromatically bound isocyanate groups. The polyisocyanates adducts have an average functionality of 2 to 6 and an NCO content of 5 to 30% by weight. Details regarding the polyisocyanate adducts and their methods of preparation are set forth in U.S. Pat. No. 5,243,012, herein incorporated by reference. Preferred polyisocyanate adducts are the polyisocyanates containing isocyanurate groups, biuret groups and/or allophanate groups.

The organic compounds containing hydroxy groups that are used to prepare the NCO prepolymers a) include high molecular weight compounds having molecular weights of 400 to about 6,000, preferably 800 to about 3,000, and optionally low molecular weight compounds with molecular weights below 400. The molecular weights are number average molecular weights ($M_n$) and are determined by end group analysis (OH number).

Examples of the high molecular weight compounds are polyester polyols, polyether polyols, polyhydroxy polycarbonates, polyhydroxy polyacetals, polyhydroxy polyacrylates, polyhydroxy polyester amides and polyhydroxy polythioethers. The polyester polyols, polyether polyols and polyhydroxy polycarbonates are preferred. Especially preferred are polyether polyols.

Suitable polyester polyols include reaction products of polyhydric, preferably dihydric alcohols to which trihydric alcohols may be added and polybasic, preferably dibasic carboxylic acids. Instead of these polycarboxylic acids, the corresponding carboxylic acid anhydrides or polycarboxylic acid esters of lower alcohols or mixtures thereof may be used for preparing the polyesters. The polycarboxylic acids may be aliphatic, cycloaliphatic, aromatic and/or heterocyclic and they may be substituted, e.g. by halogen atoms, and/or unsaturated. Examples include succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids such as oleic acid, which may be mixed with monomeric fatty acids, dimethyl terephthalates and bis-glycol terephthalate.

Suitable polyhydric alcohols include, e.g. ethylene glycol, propylene glycol-(1,2) and -(1,3), butylene glycol-(1,4) and -(1,3), hexanediol-(1,6), octanediol-(1,8), neopentyl glycol, cyclohexane dimethanol (1,4-bis-hydroxymethylcyclohexane), 2-methyl-1,3-propanediol, 2,2,4-trimethyl-1,3-pentanediol, triethylene glycol, tetraethylene glycol, polyethylene glycol, dipropylene glycol, polypropylene glycol, dibutylene glycol and polybutylene glycol, glycerine and trimethylolpropane. Polyesters of lactones, e.g. ε-caprolactone or hydroxy-carboxylic acids, e.g. ω-hydroxycaproic acid, may also be used.

Polycarbonates containing hydroxyl groups include those obtained by reacting diols (such as propanediol-(1,3), butanediol-(1,4) and/or hexanediol-(1,6), diethylene glycol, triethylene glycol or tetraethylene glycol) with phosgene, diarylcarbonates such as diphenylcarbonate or with cyclic carbonates such as ethylene or propylene carbonate. Also suitable are polyester carbonates obtained by reacting the previously described polyesters or polylactones with phosgene, diaryl carbonates or cyclic carbonates.

Suitable polyether polyols are obtained in known manner by the reaction of starting compounds which contain reactive hydrogen atoms, preferably hydroxy groups, with alkylene oxides such as ethylene oxide, propylene oxide, butylene oxide, styrene oxide, tetrahydrofuran, epichlorohydrin or mixtures of these alkylene oxides. It is preferred that the polyethers do not contain more than about 10% by weight of ethylene oxide units. Suitable starting compounds containing reactive hydrogen atoms include the polyhydric alcohols set forth for preparing the polyester polyols and, in addition, water, methanol, ethanol, 1,2,6-hexane triol, 1,2,4-butane triol, trimethylol ethane, pentaerythritol, mannitol, sorbitol, methyl glycoside, sucrose, phenol, isononyl phenol, resorcinol, hydroquinone, 1,1,1- or 1,1,2-tris-(hydroxylphenyl)-ethane.

Polyethers which have been obtained by the reaction of starting compounds containing amine compounds can also be used, but are less preferred for use in the present invention. Suitable amine starting compounds include ammonia, methyl amine, tetramethylene diamine, ethanolamine, diethanolamine, triethanolamine, ethylene diamine, diethylene triamine, triethylene tetramine, 1,6-hexane diamine, piperazine, 2,5-dimethyl piperazine, 1-amino-3-aminomethyl-3,3,5-trimethyl cyclohexane, bis-(4-aminocyclohexyl)-methane, bis-(4-amino-3-methylcyclohexyl)-methane, 1,4-cyclohexane diamine, 1,2-propane diamine, hydrazine, aminoacid hydrazides, hydrazides of semicarbazido carboxylic acids, bis-hydrazides, bis-semicarbazides, aniline, phenylene diamine, 2,4- and 2,6-toluylene diamine, polyphenylene polymethylene polyamines of the kind obtained by the aniline/formaldehyde condensation reaction and mixtures thereof. Resinous materials such as phenol and cresol resins may also be used as the starting materials.

Further details concerning the low molecular weight compounds and the other high molecular weight polyhydroxy starting materials are disclosed in U.S. Pat. No. 4,701,480, herein incorporated by reference.

The NCO prepolymers generally have an isocyanate content of about 0.5 to 30% by weight, preferably about 1 to 20% by weight, and are prepared in known manner by the reaction of the above mentioned starting materials at an NCO/OH equivalent ratio of about 1.05:1 to 10:1 preferably about 1.1:1 to 3:1. This reaction may take place in a suitable solvent which may optionally be removed by distillation after the reaction along with any unreacted volatile starting polyisocyanates still present. In accordance with the present invention NCO prepolymers also include NCO semi-prepolymers which contain unreacted starting polyisocyanates in addition to the urethane group-containing prepolymers.

Component b) is selected from aldimines corresponding to the formula:

wherein $X_1$ represents an organic group which has a valency of n and is obtained by removing the amino groups from a cyclic organic polyamine having (cyclo)aliphatically-bound amino groups, preferably a diamine and more preferably a hydrocarbon group obtained by removing the amino groups from a diamine having at least one cycloaliphatically-bound amino group, $R_1$ and $R_2$ may be the same or different and represent organic groups which are inert towards isocyanate groups at a temperature of 100° C. or less, preferably containing 1 to 10, more preferably 1 to 6, carbon atoms, or $R_1$ and $R_2$ together with the β-carbon atom form a cycloaliphatic or heterocyclic ring and n represents an integer having a value of at least 2, preferably 2 to 6, more preferably 2 to 4 and most preferably 2.

These compounds are prepared in known manner by reacting primary polyamines corresponding to the formula $$X_1-(-NH_2)_n \qquad (II)$$

with aldehydes corresponding to the formula $$O=CHCH(R_1)(R_2) \qquad (III)$$

Suitable polyamines include 1,3- and/or 1,4-cyclohexane diamine, 1-amino-2-aminomethyl cyclopentane, 1-amino-3,3,5-trimethyl-5-aminomethyl-cyclohexane (isophorone diamine or IPDA), 2,4- and/or 2,6-hexahydrotoluylene diamine, 1,3- and 1,4-bis-(aminomethyl)-cyclohexane, xylylene diamine, $\alpha,\alpha,\alpha',\alpha''$-tetramethyl-1,3- and/or 1,4-xylylene diamine, -amino-1-methyl-4(3)-aminomethyl cyclohexane, 2,4'- and/or 4,4'-diaminodicyohexyl methane and 3,3'-dialkyl-4,4'-diamino-dicyclohexyl methanes (such as 3,3'-dimethyl-4,4'-diamino-dicyclohexyl methane and 3,3'-diethyl-4,4'-diamino-dicyclohexyl methane).

Preferred diamines are 1-amino-3,3,5-trimethyl-5-aminomethyl-cyclohexane, 2,4- and/or 2,6-hexahydrotoluylene diamine, 4,4'-diamino-dicyclohexyl methane and 3,3-dimethyl-4,4'-diamino-dicyclohexyl methane. 1-amino-3,3,5-trimethyl-5-aminomethyl-cyclohexane and 4,4'-diamino-dicyclohexyl methane are especially preferred.

Examples of suitable aldehydes include isobutyraldehyde, 2-ethyl hexanal, 2-methyl butyraldehyde, 2-ethyl butyraldehyde, 2-methyl valeraldehyde, 2,3-dimethyl valeraldehyde, 2-methyl undecanal and cyclohexane carboxyaldehyde.

The aldimines may be prepared in known manner by reacting the polyamines with the aldehydes either in stoichiometric amounts or with an excess of aldehyde. The excess aldehyde and the water which is produced can be removed by distillation. The reactions may also be carried out in organic solvents, other than ketones. The solvents may also be removed by distillation after completion of the reaction.

The binders present in the coating compositions according to the invention contain NCO prepolymers a) and aldimines b) in amounts sufficient to provide an maximum equivalent ratio of isocyanate groups to aldimine groups of about 1.0:0.7, preferably about 1.0:0.6, more preferably about 1.0:0.55 and most preferably about 1.0:0.5, and a minimum equivalent ratio of 1.0:0.1, preferably 1.0:0.15, more preferably about 1.0:0.2 and most preferably about 1.0:0.25.

The binders to be used according to the invention may be prepared by simply mixing the individual components together. Preparation of the binders is carried out solvent-free or in the presence of the solvents conventionally used in polyurethane or polyurea coatings. It is an advantage of the process according to the invention that the quantity of solvent used may be greatly reduced when compared with that required in conventional one-component, moisture cure systems.

Examples of suitable solvents include xylene, butyl acetate, methyl isobutyl ketone, methoxypropyl acetate, N-methyl pyrrolidone, Solvesso solvent, petroleum hydrocarbons, iso-butanol, butyl glycol, chlorobenzenes and mixtures of such solvents.

In the coating compositions to be used for the process according to the invention, the ratio by weight of the total quantity of binder components a) and b) to the quantity of solvent is about 40:60 to 100:0, preferably about 60:40 to 100:0.

The coating compositions to be used for the process according to the invention may also contain other auxiliary agents and additives conventionally used in polyurethane and polyurea coatings, in particular pigments, fillers, catalysts, levelling agents, antisettling agents, UV stabilizers and the like.

It is also possible to incorporate other additives which increase the pot life of compositions containing polyisocyanates and polyaspartic acid derivatives, such as the tin compounds disclosed in copending application, U.S. Ser. No. 08/171,304, the disclosure of which is herein incorporated by reference, or the zeolites disclosed in U.S. Pat. No. 5,444,117, the disclosure of which is herein incorporated by reference.

The properties of the coatings obtained by the process according to the invention may be adjusted, in particular by suitable choice of the nature and proportions of the starting components a) and b). Thus, for example, the presence of relatively high molecular weight, linear polyhydroxyl compounds in the prepolymers or semi-prepolymers of component a) increases the elasticity of the coatings; whereas, the use of branched polyhydroxyl compounds to prepare the prepolymers or semi-prepolymers increases the crosslinking density and hardness of the resulting coatings.

For carrying out the process according to the invention, the coating compositions to be used according to the invention are applied as one or more layers to substrates by known methods such as spraying, brush coating, immersion or flooding or by means of rollers or doctor applicators. The process according to the invention is suitable for the formation of coatings on various substrates, e.g., metals, plastics, wood, cement, concrete or glass. The process according to the invention is particularly suitable for the formation of coatings on sheet steel, for example, for the manufacture of car bodies, machine trim panels, vats or containers. The substrates to be coated by the process according to the invention may be treated with suitable primers before the process according to the invention is carried out.

After the substrates exemplified above have been coated, the coatings may be cured at either ambient temperature, e.g., by air drying or so-called forced drying, or at elevated temperature.

The suppression of the viscosity increase for the coating compositions according to the invention while retaining the dry times is demonstrated in the examples which follow. All parts and percentages given are by weight unless otherwise indicated.

EXAMPLES

The following starting materials were used in the examples:

Polyisocyanate 1

An MDI prepolymer having a viscosity of 2000–3000 mPa.s at 25° C., an NCO content of 8% by weight and an average equivalent weight of 525 (available from Bayer as Mondur 743).

Aldimine 1—According to the Invention

The aldimine of bis-(4-aminocyclohexyl)-methane and isobutraldehyde was prepared by initially charging 1514.3 parts (21 equivalents) of isobutraldehyde and then slowly charging 2104.0 parts (20 equivalents) of bis-(4-aminocyclohexyl)-methane over a period of thirty minutes to avoid an exotherm. After the addition of the diamine the reaction mixture was stirred for one hour. At this time stirring was stopped and water was allowed to settle to the bottom of the reactor. As much water as possible was drained from the bottom of the reactor. The reaction mixture was then heated to 100° C. to remove excess isobutraldehyde. While maintaining a temperature of 100° C., a vacuum of approximately 20 mm Hg was applied to remove any final traces of aldehyde. Thereafter the vacuum was increased to 1 mm Hg to remove water until the water content was less than 0.05% (approximately 1 to 3 hours.) The aldimine had a viscosity of 100 mPa.s at 25° C., an equivalent weight of 159, an APHA color of 70, a purity as determined by GPC of 93.5% and a water content of less than 0.05%.

Aldimine 2—Comparison

The aldimine of 2-methyl pentamethylene diamine and isobutyraldehyde, which had an equivalent weight of 112, was prepared using the procedure described for aldimine 1.

Aldimine 3—According to the Invention

The aldimine of isophorone diamine and isobutyraldehyde, which had an equivalent weight of 139, was prepared using the procedure described for aldimine 1.

Catalyst

Dibutyl tin dilaurate (Dabco T-12, available from Air Products), used in the examples as a 10% solution in xylene.

Examples 1–4

The ingredients set forth in Table 1 were mixed at ambient temperature to form coating compositions having NCO:N equivalent ratios of 1.0:1.0. The viscosities of the coating compositions were measured after 24 hours and are set forth in Table 1.

TABLE 1

NCO:N Equivalent Ratio - 1.0:1.0

| Components | Parts by Weight | | | |
|---|---|---|---|---|
| | 1 (Comp) | 2 (Comp) | 3 (Comp) | 4 (Comp) |
| Polyiso 1 | 52.5 | 52.5 | 52.5 | 52.5 |
| Aldimine 1 | — | 15.9 | — | — |
| Aldimine 2 | — | — | 11.2 | — |
| Aldimine 3 | — | — | — | 13.9 |
| Catalyst | 0.5 | — | — | — |
| Brookfield Viscosity, mPa · s after 24 hrs. | 3720 | 6900 | Gelled | 7600 |

Examples 5–9

The ingredients set forth in Table 2 were mixed at ambient temperature to form coating compositions having NCO:N equivalent ratios of 1.0:0.5. The viscosities of the coating compositions were measured after 7 and 72 hours and are set forth in Table 2.

TABLE 2

NCO/N Equivalent Ratio - 1.0:0.5

| Components | Parts by Weight | | | | |
|---|---|---|---|---|---|
| | 5 (Comp) | 6 | 7 (Comp) | 8 | 9 |
| Polyiso 1 | 52.5 | 52.5 | 52.5 | 52.5 | 52.5 |
| Aldimine 1 | — | 8.0 | — | — | 8.0 |
| Aldimine 2 | — | — | 5.6 | — | — |

TABLE 2-continued

NCO/N Equivalent Ratio - 1.0:0.5

| Components | Parts by Weight | | | | |
|---|---|---|---|---|---|
| | 5 (Comp) | 6 | 7 (Comp) | 8 | 9 |
| Aldimine 3 | — | — | — | 7.0 | — |
| Catalyst | 0.5 | — | — | — | 0.1 |
| Brookfield viscosity mPa · s | | | | | |
| after ca 7 hrs. | 3,360 | 4,200 | 28,800 | 4,500 | 4,100 |
| after ca 72 hrs. | 9,800 | 12,000 | Gelled | 7,500 | 10,600 |

The data set forth in the preceding table demonstrates that at an NCO:N equivalent ratio of 1.0:0.5, the potlife/viscosity profiles for the coating compositions according to the invention, which contain diamines prepared from cycloaliphatic diamines, are similar to the profiles for the unmodified NCO prepolymer. To the contrary coating compositions containing aldimines prepared from aliphatic diamines do not have acceptable potlife/viscosity profiles.

The potlife is longer for coating compositions prepared at an NCO:N equivalent ratio of 1.0:0.5 than it is at an NCO:N equivalent ratio of 1.0:1.0. In addition, the presence of the tin catalyst resulted in a slightly longer pot life for the coating compositions according to the invention.

Examples 10–12

The ingredients set forth in Table 3 were mixed at ambient temperature to form coating compositions having NCO:N equivalent ratios of 1.0:0.25. The viscosities of the coating compositions were measured after 7 and 48 hours and are set forth in Table 3. Also, coatings were prepared from the compositions at a wet film thickness of 10 mils on glass. The Gardner surface dry times of the coatings are set forth in Table 3.

TABLE 3

NCO:N Equivalent Ratio - 1.0:0.25

| Components | Parts by Weight | | |
|---|---|---|---|
| | 10 (Comp) | 11 | 12 (Comp) |
| Polyiso 1 | 52.5 | 52.5 | 52.5 |
| Aldimine 1 | — | 4.0 | — |
| Aldimine 2 | — | — | 2.8 |
| Catalyst | 0.5 | 0.1 | 0.1 |
| Brookfield Viscosity, mPa · s | | | |
| after ca 7hrs | 3,360 | 3,400 | 11,800 |
| after ca 48 hrs | 3,400 | 4,000 | 68,800 |
| 10 mil WFT on glass surface dry time, hrs | 4–5 | <2 | 4 |

The data set forth in the preceding table demonstrates that at an NCO:N equivalent ratio of 1.0:0.25, the potlife/viscosity profiles for the coating compositions according to the invention, which contain diamines prepared from cycloaliphatic diamines, are similar to the profiles for the unmodified NCO prepolymer. To the contrary coating compositions containing aldimines prepared from aliphatic diamines do not have acceptable potlife/viscosity profiles.

The potlife is longer for coating compositions prepared at an NCO:N equivalent ratio of 1.0:0.25 than it is at an NCO:N equivalent ratio of 1.0:1.0. In addition, the dry time for the coating compositions according to the invention is faster than the dry times for either the unmodified NCO prepolymer or the coating composition containing the aldimine prepared from an aliphatic diamine. It is extremely surprising that the coating compositions according to the invention possess a longer pot life and also a faster dry time than the coating compositions containing aldimines prepared from aliphatic diamines.

Examples 13-16

The ingredients set forth in Table 4 were mixed at ambient temperature to form coating compositions at the NCO:N equivalent ratios set forth in the table. The viscosities of the coating compositions were measured after 1 and 24 hours and are set forth in Table 4. Coatings were prepared from the compositions at a wet film thickness of 10 mils on glass. The Gardner hard dry and mar free dry times of the coatings were measured and are set forth in Table 3. Also the properties of the resulting films were measured and are set forth in Table 4.

TABLE 4

|  | Parts by Weight | | | |
| --- | --- | --- | --- | --- |
| Components | 13 (Comp) | 14 (Comp) | 15 | 16 |
| Polyiso 1 | 52.5 | 52.5 | 52.5 | 52.5 |
| Aldimine 1 | — | 15.9 | 8.0 | 4.0 |
| Catalyst | 0.5 | 0.1 | 0.1 | 0.1 |
| NCO:N equivalent ratio | — | 1.0:1.0 | 1.0:0.5 | 1.0:0.25 |
| Brookfield Viscosity, mPa · s | | | | |
| after 1 hr. | 3,460 | 1,920 | 2,900 | 3,300 |
| after 24 hrs. | 3,720 | 6,900 | 3,900 | 4,100 |
| Gardner Drymeter, 10 mil WFT drawdown on glass | | | | |
| Hard Dry | 4h8' | 45' | 45' | 1h |
| Mar Free | >6h | >6h | 45' | 2h7' |
| Free Film Properties | | | | |
| Modulus, psi @ 100% E | 740 | 793 | 781 | 789 |
| Modulus, psi @ 200% E | 974 | — | 946 | 1044 |
| Modulus, psi @ 300% E | 1157 | — | 1023 | 1304 |
| Ultimate Tensile Strength, psi | 1936 | 810 | 1036 | 3795 |
| Ultimate Elongation, % | 759 | 138 | 461 | 729 |
| Tear Strength, ppi | 256 | 152 | 267 | 355 |

The data set forth in the preceding table demonstrates that at NCO:N equivalent ratios according to the present invention (Examples 15 and 16), the best combination of potlife/ viscosity profiles and dry times are obtained when compared to moisture cure NCO prepolymers (Example 13) or to coating compositions prepared at NCO:N equivalents ratios of 1.0:1.0 (Example 14).

The Gardner dry time was determined using a Gardner Circular Drying Time Recorder.

Set-to-touch—During the first stage of drying the film is mobile and partially flows back into the scribed channel. The film may be considered "set-to-touch" when it no longer flows back and the stylus begins to leave a clear channel.

Surface-dry—When the stylus no longer leaves a clear channel, but begins to rupture the dry upper layer of the curing film, the film is considered to be "surface-dry."

Hard-dry—When the stylus no longer ruptures the film, but moves freely upon the surface, the cross-section of the film may be considered to have reached the "hard-dry" condition.

Mar-free—When the stylus no longer mars the surface of the film at all the film may be considered to be "mar-free."

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A coating composition for the preparation of a polyurea coating which contains a) an NCO prepolymer containing aromatically bound isocyanate groups and b) an aldimine corresponding to the formula

wherein $X_1$ represents an organic group which has a valency of n and is obtained by removing the amino groups from a cyclic organic polyamine having (cyclo)aliphatically-bound amino groups, $R_1$ and $R_2$ are identical or different and represent organic groups which are inert towards isocyanate groups at a temperature of 100° C. or less, or $R_1$ and $R_2$ together with the β-carbon atom form a cycloaliphatic or heterocyclic ring, and n represents an integer having a value of at least 2, in which components a) and b) are present in amounts sufficient to provide an equivalent ratio of isocyanate groups to aldimine groups of about 1.0:0.7 to 1.0:0.1.

2. The composition of claim 1, wherein $X_1$ is the group obtained by removing the amino groups from isophorone diamine or bis-(4-aminocyclohexyl)-methane.

3. The composition of claim 1 wherein $R_1$ and $R_2$ are hydrocarbon radicals containing 1 to 6 carbon atoms.

4. The composition of claim 3 wherein $X_1$ is the group obtained by removing the amino groups from isophorone diamine or bis-(4-aminocyclohexyl)-methane.

5. The composition of claim 1 wherein $R_1$ and $R_2$ are methyl groups.

6. The composition of claim 5 wherein $X_1$ is the group obtained by removing the amino groups from isophorone diamine or bis-(4-aminocyclohexyl)-methane.

7. A coating composition for the preparation of a polyurea coating which contains a) an NCO prepolymer containing aromatically bound isocyanate groups and b) an aldimine corresponding to the formula

wherein $X_1$ represents an organic group which has a valency of n and is obtained by removing the amino groups from a cyclic organic polyamine having (cyclo)aliphatically-bound amino groups, $R_1$ and $R_2$ are identical or different and represent organic groups which are inert towards isocyanate groups at a temperature of 100° C. or less, or $R_1$ and $R_2$ together with the β-carbon atom form a cycloaliphatic or heterocyclic ring, and n represents an integer having a value of at least 2, in which components a) and b) are present in amounts sufficient to provide an equivalent ratio of isocyanate groups to aldimine groups of about 1.0:0.6 to 1.0:0.2.

8. The composition of claim 7 wherein $X_1$ is the group obtained by removing the amino groups from isophorone diamine or bis-(4-aminocyclohexyl)-methane.

9. The composition of claim 7 wherein $R_1$ and $R_2$ are hydrocarbon radicals containing 1 to 6 carbon atoms.

10. The composition of claim 9 wherein $X_1$ is the group obtained by removing the amino groups from isophorone diamine or bis-(4-aminocyclohexyl)-methane.

11. The compositions of claim 7 wherein $R_1$ and $R_2$ are methyl groups.

12. The composition of claim 11 wherein $X_1$ is the group obtained by removing the amino groups from isophorone diamine or bis-(4-aminocyclohexyl)-methane.

* * * * *